(12) United States Patent
Gambino et al.

(10) Patent No.: US 10,617,245 B1
(45) Date of Patent: Apr. 14, 2020

(54) PIZZA SLICE SPATULA

(71) Applicants: Claudio Gambino, Langhorne, PA (US); Giuseppe Gambino, Langhorne, PA (US)

(72) Inventors: Claudio Gambino, Langhorne, PA (US); Giuseppe Gambino, Langhorne, PA (US)

( * ) Notice: Subject to any disclaimer, the term of this patent is extended or adjusted under 35 U.S.C. 154(b) by 0 days.

(21) Appl. No.: 16/247,663

(22) Filed: Jan. 15, 2019

(51) Int. Cl.
*A47G 21/04* (2006.01)
*A47J 43/28* (2006.01)

(52) U.S. Cl.
CPC .......... *A47G 21/045* (2013.01); *A47J 43/288* (2013.01)

(58) Field of Classification Search
CPC ...... A21B 3/003; A47G 21/045; A47J 43/283; A47J 43/288; A47J 43/18; B65G 7/12
USPC .......................................................... 294/7
See application file for complete search history.

(56) References Cited

U.S. PATENT DOCUMENTS

| | | |
|---|---|---|
| 1,931,388 A | 10/1933 | Ling |
| 2,571,465 A | 10/1951 | McDevitt |
| 5,903,981 A | 5/1999 | Grow, II |
| 6,068,313 A | 5/2000 | Casper et al. |
| 6,892,419 B1 * | 5/2005 | Duprey .................. A47L 13/52 15/257.1 |
| 7,472,668 B2 * | 1/2009 | Lau ....................... E01H 1/1206 119/867 |
| D604,915 S * | 11/2009 | Teper .......................... D30/162 |
| 9,422,683 B2 * | 8/2016 | O'Hare ................. E01H 1/1206 |
| 2003/0034662 A1 | 2/2003 | Wilson |
| 2005/0011074 A1 | 1/2005 | Mounce |
| 2006/0130336 A1 | 6/2006 | Christensen et al. |
| 2007/0251098 A1 | 11/2007 | Smith et al. |
| 2008/0134517 A1 | 6/2008 | Bosworth et al. |
| 2008/0203747 A1 * | 8/2008 | Stenglein ............. A47G 21/045 294/7 |
| 2010/0263219 A1 | 10/2010 | Kempker et al. |

FOREIGN PATENT DOCUMENTS

| | | | | |
|---|---|---|---|---|
| CN | 102814823 B | | 6/2015 | |
| GB | 125849 A | * | 5/1919 | ........... A47J 43/288 |
| GB | 455162 A | * | 10/1936 | ........... A47J 43/288 |

* cited by examiner

*Primary Examiner* — Stephen A Vu
(74) *Attorney, Agent, or Firm* — Caesar Rivise, PC

(57) ABSTRACT

A spatula for holding at least one slice of pizza. The spatula includes a base and a handle. The base and includes a planar top surface, a front portion, a back edge, a pair of side edges. Each of the side edges is linear and includes a flanged portion extending at an acute angle upward from the planar top surface. The back edge includes a flanged portion extending upward at an acute angle from the planar top surface. The flanged portions extending along only a portion of the side edges, leaving the front portion of the base unflanged. The flange portions serve to confine the pizza slice on the base while enabling it to be introduced and slid off of the base from the front of the base.

20 Claims, 2 Drawing Sheets

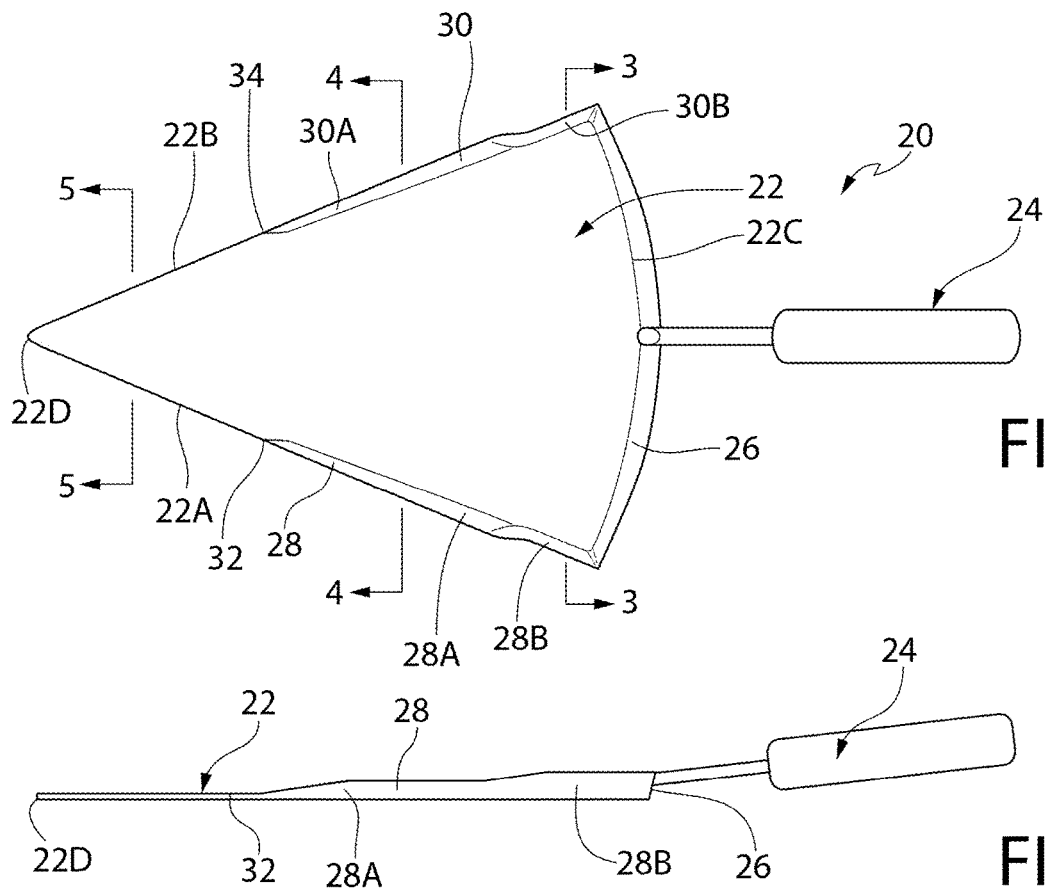
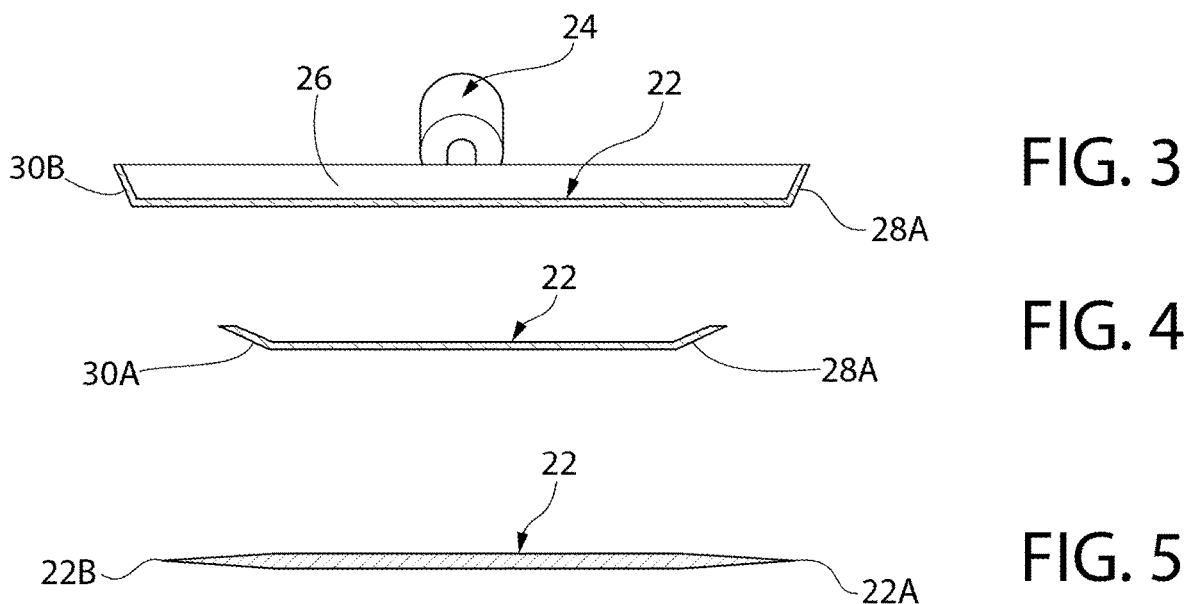

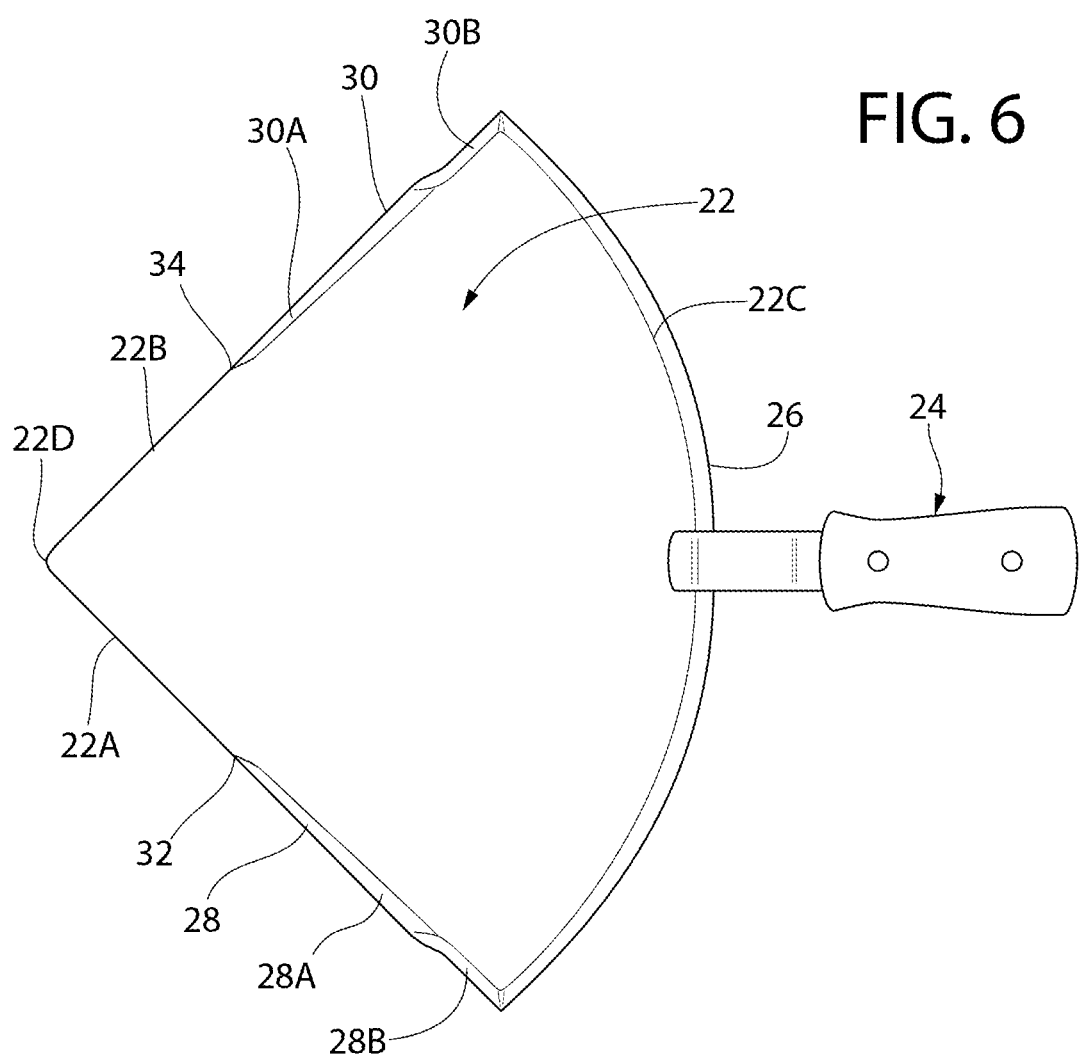

PIZZA SLICE SPATULA

CROSS-REFERENCE TO RELATED APPLICATIONS

"Not Applicable"

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates generally to utensils and more particularly to spatulas for holding slices of pizza.

BACKGROUND OF THE INVENTION

Pizza spatulas are commonly used to remove a slice of pizza from an entire pizza to carry the slice to some other location for use. For example, in a pizza shop where various pizzas are displayed on a counter so that customers can select a slice or slices to be heated in the pizza oven, a conventional spatula or server having a flat blade or base is commonly used to pick up the slice to carry it to the oven for heating. After the slice has been heated the spatula is again used to place the heated slice on a plate (if the slice is to be eaten in the shop) or in a box or bag (if the slice is to be taken out). The use of such a conventional spatula for this purpose is problematic in that the pizza slice on the spatula is susceptible to slide off of the spatula's blade. This is particularly true of the width of the slice is greater than the width of the spatula's blade, as is commonly the case. Moreover, there is also the risk that the pizza slice or a portion of it can fall off of the spatula's blade as the spatula is pulled away due to some parts of the slice not being completely separated from an immediately adjacent slice of the pizza.

The same problems hold true when a conventional spatula is used to serve the pizza. For example, in a pizza shop or restaurant where a whole sliced pizza on a tray is brought to the table of a customer to enable the customer to pick up a particular slice using a conventional spatula, the pizza slice picked up or a portion of it may slide off of the spatula blade. Moreover, if the selected slice is not completed cut or separated from the immediately adjacent slice a portion of the immediately adjacent slice may be pulled off and fall from the spatula.

The patent literature includes various spatula devices which have been designed to overcome those disadvantages of conventional spatulas to enable a slice of pizza to be removed in one piece and held securely on the device so that it or a portion of it will not slide or otherwise fall off. Examples of those devices are shown in U.S. Pat. No. 5,903,981 (Grow, II) and U.S. Pat. No. 6,068,313 (Casper et al.), and in U.S. Publication Nos. 2003/0034662 (Wilson), 2005/0011074 (Mounce), 2006/0130336 (Christensen et al.), 2007/0251098 (Smith et al.), and 2008/0134517 (Bosworth et al.).

While those devices appear generally suitable for their intended purpose they leave much to be desired from the standpoint of simplicity of construction, cost and ease of use. Accordingly, a need exists for a simple, low-cost, easy to use, safe and efficient spatula for picking up and transporting pizza slices. The subject invention addresses that need.

SUMMARY OF THE INVENTION

In accordance with one aspect of the invention there is provided a spatula for holding at least one slice of pizza. The spatula comprises a planar base and a handle. The planar base comprising plural flange portions and has a top surface, a front portion, a back edge, a pair of side edges. The plural flange portions include a back flange and a pair of side flanges. The side edges of the planar base are located between the front portion and the back edge. The back flange extends upward at an angle to the top surface along at least a portion of the back edge. Each of the side edges has a predetermined length and is linear. Each side flange extends upward at an angle to the top surface of the planar base along only a portion of the predetermined length of the side edges, whereupon the front portion of the base does not include any flange portions. The handle is located at the back portion of the base.

In accordance with one preferred aspect of this invention the planar base is of a generally triangular shape, and wherein the linear side edges merge together at a tip at the front portion of the planar base.

In accordance with another preferred aspect of this invention the back edge is arcuate.

In accordance with another preferred aspect of this invention the back flange extends upward at an acute angle to the top surface of the planar base.

In accordance with another preferred aspect of this invention the side flanges extend upward at an acute angle to the top surface of the planar base.

In accordance with another preferred aspect of this invention the back edge has a predetermined length and wherein the back flange extends the entire predetermined length of the back flange.

In accordance with another preferred aspect of this invention each of the side flanges merges with a respective end of the back flange.

In accordance with another preferred aspect of this invention each of the side flanges includes a forward end which slopes down and merges with the top surface of the planar base.

In accordance with another preferred aspect of this invention the side edges at the front portion of the base are in the form of respective cutting edges.

In accordance with another preferred aspect of this invention the handle is fixedly secured to the back flange.

In accordance with another preferred aspect of this invention the base is formed of a selected one of metal, plastic, ceramic, wood and any combination thereof.

In accordance with another preferred aspect of this invention the handle is formed of a selected one of metal, plastic, ceramic, wood and any combination thereof.

DESCRIPTION OF THE DRAWING

FIG. 1 is a top plan view of one exemplary spatula constructed in accordance with this invention for picking up, holding and transporting a single slice of pizza;

FIG. 2 is a side elevational view of the spatula shown in FIG. 1;

FIG. 3 is an enlarged cross-sectional view taken along line 3-3 of FIG. 1;

FIG. 4 is an enlarged cross-sectional view taken along line 4-4 of FIG. 1;

FIG. 5 is a more greatly enlarged cross-sectional view taken along line 5-5 of FIG. 1; and FIG. 6 is a top plan view of another exemplary spatula constructed in accordance with this invention for picking up, holding and transporting two slices of pizza side-by-side.

DETAILED DESCRIPTION OF THE PREFERRED EMBODIMENT

Referring now to the various figures of the drawing wherein like reference characters refer to like parts, there is shown at 20 in FIG. 1 one exemplary embodiment of a pizza server spatula constructed in accordance with the subject invention. The spatula basically comprises a spatula configured for removing one or more slices 10A of a pizza 10 that has been cut, so that the spatula can be manipulated to remove one or more slices of the pizza from the pizza pie to serve those slices. To that end, the spatula basically comprises a base 22 and a handle 24. The base is formed of any suitable material, e.g., stainless steel, other metals, ceramics, plastics, woods or any combination thereof. In any case the base 22 is configured hold a single or multiple slices of pizza securely on it so that the slice or slices cannot slip off the back of the spatula base or laterally from the sides of the spatula base. To that end, the base 22 is a generally planar member which is shaped to closely accommodate the shape and size of the pizza slice(s) it will be used to serve. Thus, for a round pizza cut into normal wedge shaped slices, the base is of a generally triangular or wedge shape having a pair of angled linear side edges 22A and 22B and a rounded back edge 22C. The two linear side edges 22A and 22B merge together at the front or tip 22D of the base 22. The back edge 22C forms an arc of a circle whose diameter is the diameter of the round pizza from which the slices will be removed.

In accordance with one preferred aspect of this invention, the base 22 includes plural flanged edge portions which act to prevent the slice or slices of the pizza that is/are disposed on the base from slipping off from the back of the spatula or laterally from the sides of the spatula as the slice or slices is being transported by the spatula, but allowing the slice(s) to readily slide or slip off the front of the spatula when desired, e.g., when that/those slices is/are being placed into a pizza oven for heating or onto a plate for eating or into a box or bag for carry-out. To that end, the back edge 22C of the base 22 includes an upwardly extending arcuate flange 26. The flange 26 extends at an acute angle to the base 22. The two angled side edges 22A and 22B include upwardly extending linear flanges 28 and 30, respectively. The linear flange 28 extends from one side end of the arcuate back edge flange 26 to a merge point 32 which is remote (e.g., approximately ⅓ the length of the side edge 22A) from the tip 22D. The linear flange 30 extends from the other side end of the arcuate back edge flange 26 to a merge point 34 which is remote (e.g., approximately ⅓ the length of the side edge 22B) from the tip 22D.

As best seen in FIGS. 2-4, the flange 28 includes two sequentially located portions 28A and 28B. The flange portion 28A is located with its front end at the merge point 32 and its rear end is at the front of the flange portion 28B. The flange portion 28A extends at an acute angle, e.g., approximately 40 degrees, to the planar base 22, with the top edge of the flange portion 28A being approximately 5 mm above the top surface of the planar base. The front of the flange portion 28A slopes downward in height so that it merges with the top surface of the base at the merge point 32. The flange portion 28B extends at an angle of approximately 90 degrees to the planar base 22, with the top edge of the flange portion 28B being approximately ½ inch above the top surface of the planar base and at the same elevation as the top edge of the arcuate back flange 26. The flange portion 28B may, if desired, extend at an acute angle to the planar base. The remainder of the side edge 22A from the merge point 32 to the tip 22D does not include any flange (i.e., is "unflanged").

In a similar manner, the linear flange 30 includes two sequentially located portions 30A and 30B. The flange portion 30A is located with its front end at the merge point 34 and its rear end is at the front of the flange portion 30B. The flange portion 30A extends at an acute angle, e.g., approximately 40 degrees, to the planar base 22, with the top edge of the flange portion 30A being approximately 5 mm inches above the top surface of the planar base. The front of the flange portion 30A slopes downward in height so that it merges with the top surface of the base at the merge point 34. The flange portion 30B extends at an angle of approximately 90 degrees, to the planar base 22, with the top edge of the flange portion 30B being approximately ½ inch above the top surface of the planar base and at the same elevation as the top edge of the arcuate back flange 26. The flange portion 30B may, if desired, extend at an acute angle to the planar base. The remainder of the side edge 22B from the merge point 32 to the tip 22D is also unflanged.

Since the front portion of the spatula base 22 along the side edges 22A and 22B from the tip 22D back to the merge points 32 and 34 is planar and unflanged it is thus shaped somewhat like a conventional spatula. The front portion of the spatula serves as the portion of the spatula which is introduced under the edge of pizza towards the center to remove the slice or slices of the pizza and place that slice or slices on the top surface of the base with portions of the sides and crust of the pizza slice bounded by the flanges 26, 28 and 30. Moreover, the front portion of the spatula also serves as the portion from which the slice or slices of the pizza disposed on the base can be slid off to introduce the slice/slices into an oven for heating or to serve that/those slice(s) onto a plate or introduce that/those slices into a box or bag for take-out.

In accordance with another preferred aspect of this invention, each of the side edges 22A and 22B which are located in the front portion of the spatula are somewhat sharp, e.g., they taper to a pointed edge, in cross-section as clearly shown in FIG. 5. Thus, each of the side edge portions 22A and 22B at the front of the base 22 contiguous with the tip 22D can serve as a cutting edge to enable a user to cut the pizza slice, if necessary, to free it from the immediately adjacent slice of pizza. As such the user can cleanly remove the selected pizza slice from the pizza without dragging any portion of the immediately adjacent slice away from it.

The handle 24 is fixedly secured to the back edge flange 26 and extends backward therefrom. The handle 24 can be of any type or construction. In the exemplary embodiment the handle is an elongated cylindrical member which can be formed of any suitable material, e.g., plastic, wood, metal, ceramic and any combination thereof.

As is known on average there are 6 slices per small (8-10 inch diameter) round pizza, 8 slices per medium (12 inch diameter) round pizza, 10 slices per large (14 inch diameter) round pizza and 12 slices per extra-large (16-18 inch diameter) round pizza. Thus, for a 12 inch diameter round pizza that is cut into 8 pieces a spatula constructed in accordance with this invention would be configured so that each of the side edges 22A and 22B of the base 22 is approximately 6 inches long, with the arcuate back edge extending for approximately 45 degrees.

It should be noted that the exemplary embodiment of the spatula 20 is merely exemplary of one of numerous embodiments of a spatula constructed in accordance with this invention. Thus, for example, the spatula may take a form wherein it holds more than one slice of pizza side-by-side on it. One such alternative embodiment 120 is shown in FIG. 6. That embodiment is similar in construction to the embodiment 20 except that its base portion is sized and shaped to accommodate two slices of a round pizza on it side-by-side. In the interest of brevity the common features of the spatulas 20 and 120 will be given the same reference characters and the details of their construction, arrangement and function will not be reiterated. Since the spatula 120 is designed to hold two slices of pizza on it, side-by-side, if the slices are of a medium size pizza, the arcuate back edge extends for approximately 90 degrees.

While the spatulas 20 and 120 described heretofore are particularly suited for round pizza cut into wedge shaped slices, the subject invention also contemplates spatulas designed for use with rectangular or square pizzas cut into rectangular or square shaped slices. In such a case, the base 22 of the spatula will be of a shape and size corresponding to the shape/size of the pizza slice to be held thereby. Thus, the base may be rectangular or square, having an unflanged front edge, a flanged back edge and a pair of side edges. The back edge will include a flange like flange 26, except that the back flange will be linear instead of being arcuate. Each of the side edges will be linear and will be flanged like the flanges 28 and 30 of the embodiments 20 and 120. The front portion of the square or rectangular base spatula will be unflanged. Thus, the slice or slices of the pizza can be placed on the top surface of the base by introducing the front portion of the spatula under an edge of the square or rectangular pizza where the slice or slices to be removed are located. Moreover, the side edges at the front of the square or rectangular shaped spatula will also preferably be sharp to serve as cutting edges, like those of the spatula 20 and 120 described.

Without further elaboration the foregoing will so fully illustrate our invention that others may, by applying current or future knowledge, adopt the same for use under various conditions of service.

We claim:

1. A spatula for holding at least one slice of pizza, said spatula comprising:
   a planar base comprising plural flange portions, said planar base being of a generally V-shape and having a top surface, a front portion, a back edge, a pair of linear side edges, said back edge having a pair of respective ends, said linear side edges tapering together from respective ones of said pair of respective ends of said back edge to form a generally V-shaped point at said front portion, each of said linear side edges at said front portion tapering in cross section to form a respective cutting edge, said plural flange portions including a back flange and a pair of side flanges, said side flanges extending along a portion of said side edges adjacent to said back flange and being located between said front portion and said back edge and being fixedly secured and immovable with respect to said planar base, said back flange extending upward at an angle to said top surface along at least a portion of said back edge, each of said side edges having a predetermined length and being linear, each said side flange extending upward at an angle to said top surface of said planar base along only a portion of the predetermined length of said side edges, whereupon said front portion of said base does not include any flange portions and wherein said cutting edges of said linear side edges are configured to cut a portion of pizza to facilitate the separation of said at least one slice of pizza from at least another portion of a pizza; and
   a handle located at said back portion of said base.

2. The spatula of claim 1, wherein said back edge is arcuate.

3. The spatula of claim 1, wherein said back flange extends upward at an acute angle to said top surface of said planar base.

4. The spatula of claim 3, wherein said side flanges extend upward at an acute angle to said top surface of said planar base.

5. The spatula of claim 1, wherein said side flanges extend upward at an acute angle to said top surface of said planar base.

6. The spatula of claim 1, wherein said back edge has a predetermined length and wherein said back flange extends the entire predetermined length of said back flange.

7. The spatula of claim 1, wherein each of said side flanges merges with a respective end of said back flange.

8. The spatula of claim 1 wherein said spatula is configured to hold more than one slice of pizza side-by-side.

9. The spatula of claim 1, wherein said handle is fixedly secured to said back flange.

10. The spatula of claim 1, wherein said base is formed of a selected one of metal, plastic, ceramic, wood and any combination thereof.

11. The spatula of claim 1, wherein said handle is formed of a selected one of metal, plastic, ceramic, wood and any combination thereof.

12. A spatula for holding at least one slice of pizza, said spatula comprising:
    a planar base comprising plural flange portions, said planar base being of a generally V-shape and having a top surface, a front portion, a back edge, a pair of linear side edges, said back edge having a pair of respective ends, said linear side edges tapering together from respective ones of said pair of respective ends of said back edge to form a generally V-shaped point at said front portion, each of said linear side edges at said front portion tapering in cross section to form a respective cutting edge, said plural flange portions including a back flange and a pair of side flanges, said side edges of said planar base being located between said front portion and said back edge, said back flange extending upward at an angle to said top surface along at least a portion of said back edge, each of said side edges having a predetermined length and being linear, each of said side flanges extending upward at an angle to said top surface of said planar base along only a portion of the predetermined length of said side edges, and wherein each of said side flanges includes a forward end which slopes down and merges with said top surface of said planar base, whereupon said front portion of said base does not include any flange portions and wherein said cutting edges of said linear side edges are configured to cut a portion of pizza to facilitate the separation of said at least one slice of pizza from at least another portion of a pizza; and a handle located at said back portion of said base.

13. The spatula of claim 12, wherein said handle is formed of a selected one of metal, plastic, ceramic, wood and any combination thereof.

14. The spatula of claim 12, wherein said back edge is arcuate.

15. The spatula of claim 12, wherein said back flange extends upward at an acute angle to said top surface of said planar base.

16. The spatula of claim 12, wherein said side flanges extend upward at an acute angle to said top surface of said planar base.

17. The spatula of claim 12, wherein said back edge has a predetermined length and wherein said back flange extends the entire predetermined length of said back flange.

18. The spatula of claim 12, wherein each of said side flanges merges with a respective end of said back flange.

19. The spatula of claim 12 wherein said spatula is configured to hold more than one slice of pizza side-by-side.

20. The spatula of claim 12, wherein said base is formed of a selected one of metal, plastic, ceramic, wood and any combination thereof.

* * * * *